(12) United States Patent
Spitz

(10) Patent No.: US 10,906,551 B2
(45) Date of Patent: Feb. 2, 2021

(54) TRAVELING WORK VEHICLE EQUIPPED WITH WORK APPARATUS

(71) Applicant: KUBOTA CORPORATION, Osaka (JP)

(72) Inventor: David Spitz, Atlanta, GA (US)

(73) Assignee: KUBOTA CORPORATION, Osaka (JP)

( * ) Notice: Subject to any disclaimer, the term of this patent is extended or adjusted under 35 U.S.C. 154(b) by 238 days.

(21) Appl. No.: 16/027,833

(22) Filed: Jul. 5, 2018

(65) Prior Publication Data

US 2020/0010092 A1    Jan. 9, 2020

(51) Int. Cl.
*B60W 50/00*    (2006.01)

(52) U.S. Cl.
CPC ..... *B60W 50/00* (2013.01); *B60W 2050/0011* (2013.01); *B60W 2300/156* (2013.01); *B60W 2510/0638* (2013.01)

(58) Field of Classification Search
CPC ......... B60W 50/00; B60W 2050/0011; B60W 2300/156; B60W 2510/0638
USPC .......................................................... 701/93
See application file for complete search history.

(56) References Cited

U.S. PATENT DOCUMENTS

| | | | |
|---|---|---|---|
| 8,763,355 B2 | 7/2014 | Sugio | |
| 9,867,331 B1* | 1/2018 | Siudyla | A01D 34/008 |
| 10,363,927 B2* | 7/2019 | Ono | B60K 6/12 |
| 10,661,831 B2* | 5/2020 | Rotole | B62D 5/09 |
| 2003/0228893 A1* | 12/2003 | Ho | F16H 61/46 460/6 |
| 2009/0000839 A1* | 1/2009 | Ishii | A01D 34/43 180/65.51 |
| 2009/0182475 A1* | 7/2009 | Kishii | B60W 30/18063 701/67 |
| 2010/0307843 A1* | 12/2010 | Lawson, Jr. | B62D 11/06 180/6.48 |
| 2011/0127093 A1* | 6/2011 | Koga | B62D 11/04 180/6.24 |
| 2011/0196585 A1* | 8/2011 | Ishibashi | F16H 61/0213 701/51 |
| 2012/0150390 A1* | 6/2012 | Ruhter | E02F 9/2296 701/42 |

(Continued)

*Primary Examiner* — Tuan C To
(74) *Attorney, Agent, or Firm* — Greenblum & Bernstein, P.L.C.

(57) ABSTRACT

A traveling work vehicle includes: a vehicle speed control portion configured to control the vehicle speed; a number-of-revolutions calculation portion configured to calculate, as an actual number of revolutions, a number of revolutions of a single rotary power source per unit time; a number-of-revolutions command generation portion configured to generate a number-of-revolutions command using a requested number of revolutions; a requested vehicle speed input portion configured to input a requested vehicle speed that is based on a user operation; a requested vehicle speed calculation portion configured to calculate a computed requested vehicle speed using a deviation between the requested number of revolutions and the actual number of revolutions, and the requested vehicle speed; and a vehicle speed command generation portion configured to give the vehicle speed control portion a vehicle speed command that is generated using the computed requested vehicle speed.

10 Claims, 5 Drawing Sheets

(56) References Cited

U.S. PATENT DOCUMENTS

| | | | |
|---|---|---|---|
| 2013/0066496 A1* | 3/2013 | Ishii | B60K 6/485 |
| | | | 701/22 |
| 2014/0062352 A1* | 3/2014 | Wang | H02P 29/028 |
| | | | 318/139 |
| 2014/0090367 A1* | 4/2014 | Hijikata | E02F 9/268 |
| | | | 60/414 |
| 2014/0180542 A1* | 6/2014 | Vora | F16H 61/46 |
| | | | 701/22 |
| 2014/0288763 A1* | 9/2014 | Bennett | B62D 21/186 |
| | | | 701/31.6 |
| 2014/0365077 A1* | 12/2014 | Kariatsumari | B62D 6/002 |
| | | | 701/41 |
| 2015/0008054 A1* | 1/2015 | Hoshino | E02F 9/2075 |
| | | | 180/65.26 |
| 2015/0057890 A1* | 2/2015 | Tamaizumi | B62D 6/008 |
| | | | 701/41 |
| 2015/0066309 A1* | 3/2015 | Porter | B60W 10/02 |
| | | | 701/48 |
| 2015/0134202 A1* | 5/2015 | Dawson | B62D 6/007 |
| | | | 701/41 |
| 2016/0131248 A1* | 5/2016 | Mizuno | F16H 61/0202 |
| | | | 701/51 |
| 2016/0325777 A1* | 11/2016 | Mori | H02P 6/12 |
| 2017/0089039 A1* | 3/2017 | Imai | B60W 30/1882 |
| 2017/0217477 A1* | 8/2017 | Akatsuka | B62D 5/0463 |
| 2019/0092388 A1* | 3/2019 | Raad | B62D 15/024 |
| 2019/0352881 A1* | 11/2019 | Oasa | B60W 10/06 |

* cited by examiner

TRAVELING WORK VEHICLE EQUIPPED WITH WORK APPARATUS

TECHNICAL FIELD

The present invention relates to a traveling work vehicle that includes a rotary power source, a work apparatus that receives power from the rotary power source, and a traveling unit that receives power from the rotary power source.

BACKGROUND ART

U.S. Pat. No. 8,763,355 discloses a mowing machine that includes a traveling transmission mechanism that transmits power from an engine, which serves as a rotary power source, to a rear-wheel unit, and a mower transmission mechanism that transmits power from the engine to a mower unit. A right rear wheel and a left rear wheel of this mowing machine are driven independently of each other. For this reason, a right rear-wheel continuously variable transmission and a left rear-wheel continuously variable transmission are incorporated in the traveling transmission mechanism. The vehicle speed is changed by adjusting the right rear-wheel continuously variable transmission and the left rear-wheel continuously variable transmission using a pair of left and right steering levers. The number of rotations of a blade in the mower unit is proportional to the number of revolutions of the engine. The number of revolutions of the engine can be set using an engine number-of-revolutions adjustment tool, such as an accelerator lever. However, a high number of revolutions of the engine is required to improve mowing performance of the mower unit. The adjustment of the number of revolutions of the engine and the adjustment of the vehicle speed are not interlocked. For this reason, an operator needs to carefully adjust the vehicle speed so that a heavy load is not placed on the engine.

SUMMARY OF THE INVENTION

The present invention aims to provide a traveling work vehicle in which adjustment of the number of revolutions of the engine and the adjustment of vehicle speed can be interlocked.

A traveling work vehicle according to the present invention includes: a single rotary power source; a work apparatus that receives power from the rotary power source; a traveling unit that receives power from the rotary power source; a vehicle speed control portion configured to control a vehicle speed of the traveling unit; a number-of-revolutions calculation portion configured to calculate, as an actual number of revolutions, a number of revolutions of the rotary power source per unit time; a power control portion configured to control the number of revolutions of the rotary power source; a number-of-revolutions command generation portion configured to generate a number-of-revolutions command to be given to the power control portion, using a requested number of revolutions for the rotary power source; a requested vehicle speed input portion configured to input a requested vehicle speed that is based on a user operation; a requested vehicle speed calculation portion configured to calculate a computed requested vehicle speed using a deviation between the requested number of revolutions and the actual number of revolutions, and the requested vehicle speed; and a vehicle speed command generation portion configured to give the vehicle speed control portion a vehicle speed command that is generated using the computed requested vehicle speed.

In this configuration, when a vehicle speed command for driving the traveling unit is generated from the requested vehicle speed based on a user operation, consideration is given to the deviation between the requested number of revolutions for the rotary power source, such as an engine, and the actual number of revolutions of the rotary power source. That is to say, the adjustment of the number of revolutions of the engine and the adjustment of vehicle speed are interlocked. As a result, an appropriate vehicle speed that does not adversely affect work travel of the work apparatus and the traveling apparatus is achieved while keeping the vehicle speed based on the user operation as much as possible.

PID control is preferable for control using a deviation. Accordingly, in a preferable embodiment of the present invention, the requested vehicle speed calculation portion has a PID computation function of performing computation for PID control using the deviation, if the deviation is within a tolerable range, the requested vehicle speed calculation portion sets the requested vehicle speed as the computed requested vehicle speed, and if the deviation is out of the tolerable range, the requested vehicle speed calculation portion sets a computed value obtained by the PID computation function as the computed requested vehicle speed.

DETAILED DESCRIPTION OF PREFERRED EMBODIMENTS

Figure 1:
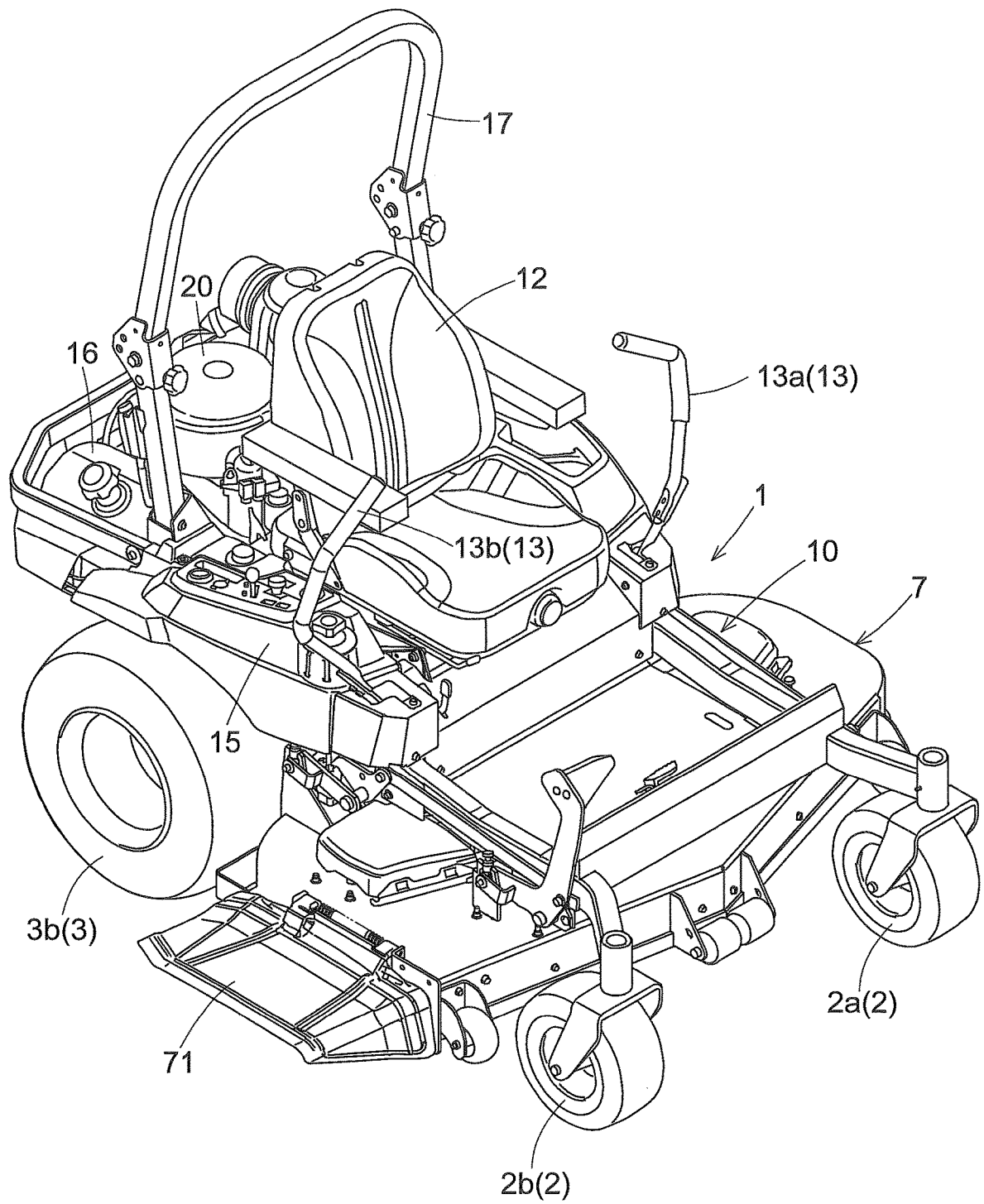
FIG. 1 is a perspective view of a mowing machine.
Figure 2:
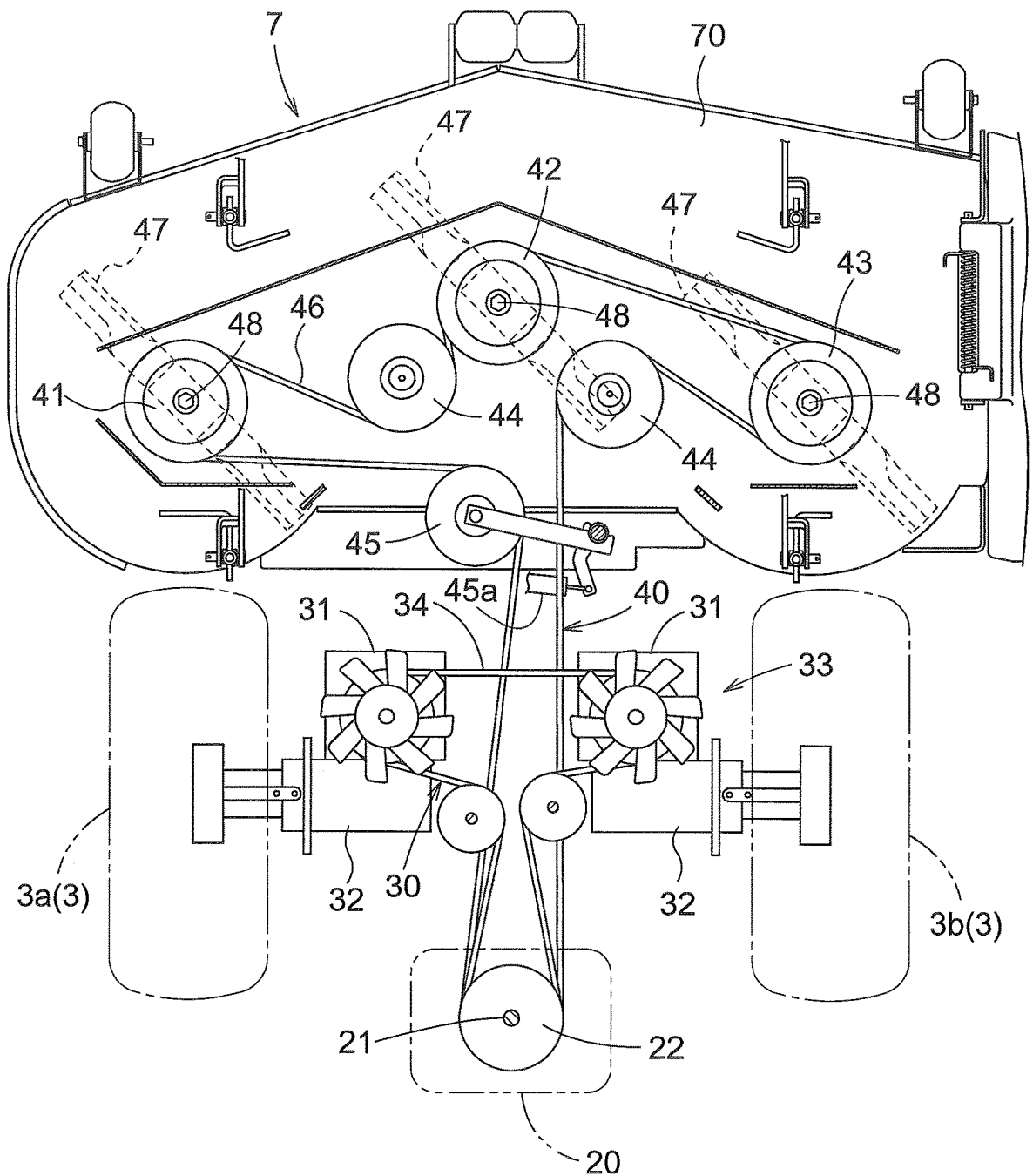
FIG. 2 is a diagram showing a power system of the mowing machine.

A description will be given below, based on the drawings, of a mowing machine, which is an embodiment of a traveling work vehicle according to the present invention. FIG. 1 is a perspective view of a mowing machine. FIG. 2 is a diagram showing a power system of the mowing machine. Note that, in this specification, "front" means a front side relative to a front-rear direction for the machine body (traveling direction), and "rear" means a rear side relative to the front-rear direction for the machine body (traveling direction), unless stated otherwise. A left-right direction and a lateral direction mean a transverse direction for the machine body (i.e. the width direction for the machine body) that is perpendicular to the front-rear direction for the machine body. "Above/upper" and "below/lower" describe a positional relationship at ground height in a vertical direction for the machine body.

The mowing machine has a vehicle body 1, which is supported relative to the ground by a front-wheel unit 2, which is a caster unit, and a rear-wheel unit, which is a traveling unit 3. This mowing machine is a so-called zero-turn mower, and a left rear wheel 3a and a right rear wheel 3b, which are configured as the traveling unit 3, can be independently subjected to forward/reverse speed control. The front-wheel unit 2 includes a pair of left and right front wheels 2a and 2b. A main constituent element of the vehicle body 1 is a frame 10, which is constituted by square pipe material or the like. A mower unit 7 is suspended from the frame 10 between the front-wheel unit 2 and the traveling unit 3 so as to be able to move up and down.

The frame 10 extends in the front-rear direction, and an operator seat 12 is provided at a center portion of the frame 10. A floor plate is laid on an upper face of a front portion of the frame 10, and is used as a footrest for an operator. An engine 20, which is an internal combustion engine, engine accessories, and the like are provided at a rear portion of the frame 10. The engine 20 is used as a single rotary power source in the present invention. The engine 20 is arranged in an orientation in which an engine output shaft 21 (see FIG. 2) protrudes downward. A fuel tank 16 is arranged on a side of the engine 20.

Fenders 15 are provided on both left and right sides of the operator seat 12. User operation devices, such as various operating levers and operation buttons, are arranged on upper faces of the fenders 15. An arch-shaped ROPS 17 is provided so as to stand upright behind the operator seat 12.

A steering unit 13, which is one of the user operation devices, is constituted by a left steering lever 13a, which is arranged on the left side of the operator seat 12, and a right steering lever 13b, which is arranged on the right side of the operator seat 12. The left steering lever 13a is used to adjust the number of rotations of the left rear wheel 3a, and the right steering lever 13b is used to adjust the number of rotations of the right rear wheel 3b. The left steering lever 13a and the right steering lever 13b can be displaced to pivot over a forward gear area, neutral, and a reverse gear area.

As schematically shown in FIG. 2, the power transmission system includes a traveling transmission mechanism 30, which transmits engine power to the traveling unit 3, and a work transmission mechanism 40, which transmits engine power to the mower unit 7. Power from the engine 20 is output from an output pulley 22, which has two stages that are upper and lower stages, and is attached to the engine output shaft 21.

The traveling transmission mechanism 30 includes a pair of left and right HSTs (hydrostatic transmissions) 31, a pair of left and right gear transmission mechanisms 32, and a traveling belt transmission mechanism 33. The traveling belt transmission mechanism 33 transmits power output from the output pulley 22 to the HSTs 31 via a traveling belt 34. The gear transmission mechanisms 32 transmit, to the traveling unit 3 that includes the rear wheels (left rear wheel 3a and right rear wheel 3b), the power that has been subjected to speed change by the HSTs 3.

Speed change at the left and right HSTs 31 is performed in response to a control signal that is generated based on pivoting operations made to the left steering lever 13a and the right steering lever 13b, respectively. A stopped state, a rectilinear state, a slow turning state, a pivot turning state, and a spin turning state are achieved by user operations made to the left steering lever 13a and the right steering lever 13b. The stopped state is achieved by stopping the left rear wheel 3a and the right rear wheel 3b. The rectilinear state is achieved by forwardly or reversely driving the left rear wheel 3a and the right rear wheel 3b at the same speed. The slow turning state is achieved by forwardly and reversely driving the left rear wheel 3a and the right rear wheel 3b at different speeds. The pivot turning state is achieved by stopping one of the left rear wheel 3a and the right rear wheel 3b, and forwardly or reversely driving the other one of the left rear wheel 3a and the right rear wheel 3b. The spin turning state is achieved by forwardly driving one of the left rear wheel 3a and the right rear wheel 3b, and reversely driving the other one of the left rear wheel 3a and the right rear wheel 3b.

The mower unit 7 includes a mower deck 70, which is constituted by a top plate 70a and a side plate 70b. In an internal space of the mower deck 70, three blades 47 are provided, which are arranged in a transverse direction for the vehicle body, as schematically shown in FIG. 2. The blades 47 are fixed to drive shafts 48, which are supported with bearings by the top plate 70a of the mower deck 70. The work transmission mechanism 40 is provided in order to transmit power from the output pulley 22 of the engine 20 to the drive shafts 48. This work transmission mechanism 40 is configured as a work belt transmission mechanism. The work transmission mechanism 40 includes input pulleys 41, 42, and 43, which are fixed to the drive shafts 48 of the respective blades 47, direction change pulleys 44, a tension clutch pulley 45, which serves as a work clutch, and a work belt 46, which is hung around these pulleys. With this configuration, the blades 47 rotate at the number of rotations that is proportional to the number of revolutions of the engine. The tension clutch pulley 45 is switched to an ON state or an OFF state by a clutch solenoid 45a.

Figure 3:
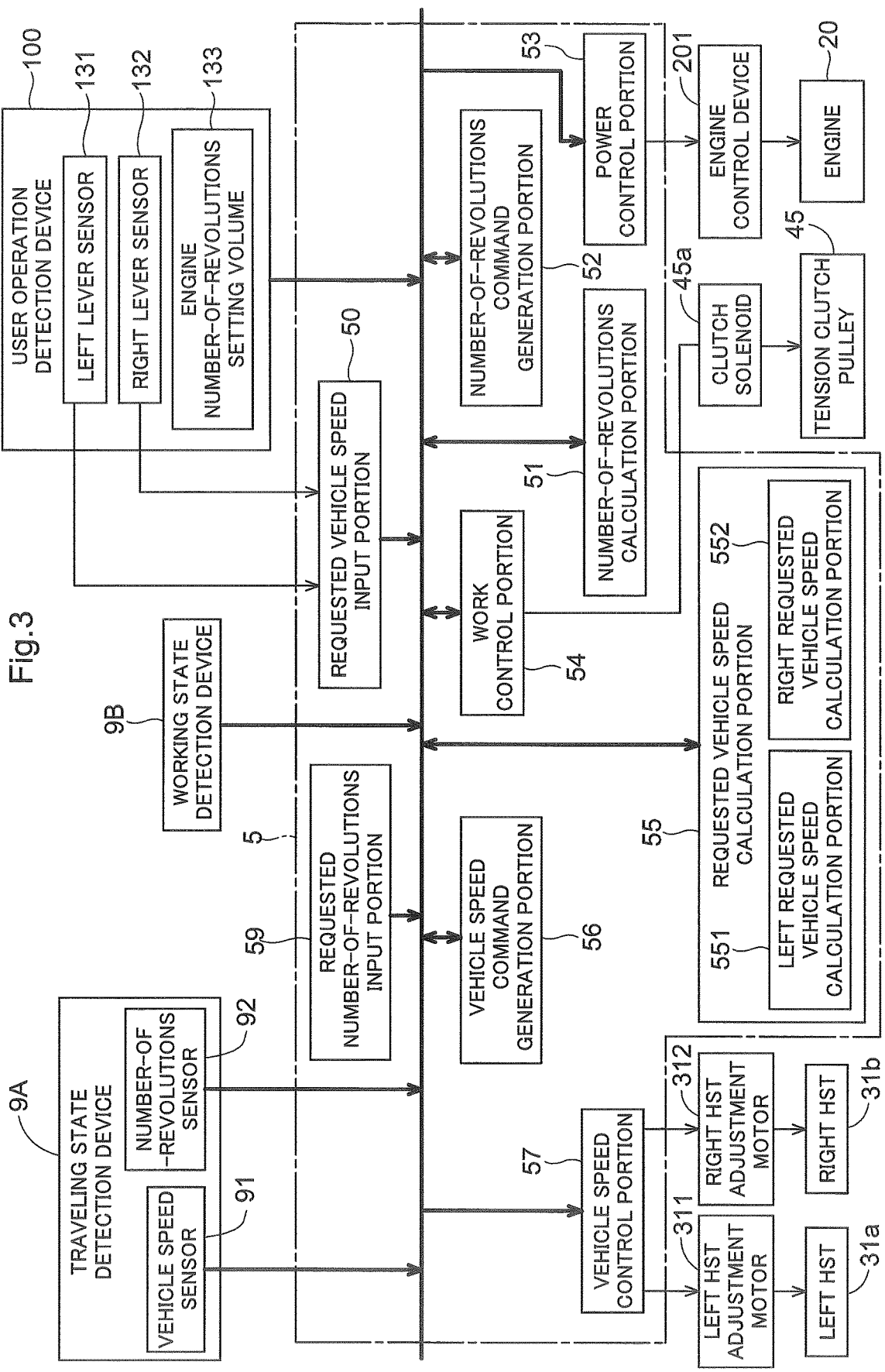
FIG. 3 is functional block diagram of a control system of the mowing machine.

A control system of this mowing machine that is related to engine number-of-revolutions control and vehicle speed control is shown in FIG. 3. A core member of this control system is a control unit 5, which substantially is a computer system. A traveling state detection device 9A, a working state detection device 9B, a user operation detection device 100, and the like are connected to the control unit 5. The traveling state detection device 9A is a generic name of sensors for detecting a state regarding traveling of the mowing machine, switches, and the like, and includes a vehicle speed sensor 91 for detecting the vehicle speed, namely the traveling speed of the vehicle body 1, and a number-of-revolutions sensor 92 for detecting the number of revolutions of the engine 20. The working state detection device 9B is a generic name of sensors for detecting a working state of the mower unit 7, switches, and the like. The user operation detection device 100 is a generic name of sensors for detecting user operations, switches, and the like. The user operation detection device 100 includes a left lever sensor 131 for detecting pivoting displacement of the left steering lever 13a, a right lever sensor 132 for detecting pivoting displacement of the right steering lever 13b, and an engine number-of-revolutions setting volume 133 for detecting a set value of an engine number-of-revolutions setting device.

Furthermore, an engine control device 201, the clutch solenoid 45a, a left HST adjustment motor 311, a right HST adjustment motor 312, and the like are connected to the control unit 5. The engine control device 201 adjusts the number of revolutions of the engine 20 based on a control signal from the control unit 5. The clutch solenoid 45a performs an operation to turn on and off the tension clutch pulley 45 based on a control signal from the control unit 5. The left HST adjustment motor 311 and the right HST adjustment motor 312 adjust the angle of swash plates of the left HST 31a and the right HST 31b, respectively, to change the vehicle speed, based on a control signal from the control unit 5.

The control unit 5 includes a requested vehicle speed input portion 50, a number-of-revolutions calculation portion 51, a number-of-revolutions command generation portion 52, a power control portion 53, a work control portion 54, a requested vehicle speed calculation portion 55, a vehicle speed command generation portion 56, a vehicle speed control portion 57, and a requested number-of-revolutions input portion 59.

The number-of-revolutions calculation portion 51 calculates, as an actual number of revolutions, the number of revolutions per unit time of the engine 20 based on a detection signal from the number-of-revolutions sensor 92. The number-of-revolutions command generation portion 52 generates a number-of-revolutions command using a requested number of revolutions that is calculated based on a signal from the engine number-of-revolutions setting volume 133. The power control portion 53 generates a control signal for controlling the number of revolutions of the engine 20 using the number of revolutions that is based on the number-of-revolutions command generated by the number-of-revolutions command generation portion 52, and gives the generated control signal to the engine control device 201.

The requested vehicle speed input portion 50 inputs a requested vehicle speed that is based on user operations made to the left steering lever 13a and the right steering lever 13b (a vehicle speed desired by a user), based on detection signals from a left lever sensor 131 and a right lever sensor 132. The requested number-of-revolutions input portion 59 inputs a requested number of revolutions based on a detection signal from the engine number-of-revolutions setting volume 133, which detects an amount of user operation made to an engine number-of-revolutions setting device (not shown).

The requested vehicle speed calculation portion 55 calculates a computed requested vehicle speed using a deviation between the requested number of revolutions calculated by the number-of-revolutions command generation portion 52 and the actual number of revolutions calculated by the number-of-revolutions calculation portion 51, and the requested vehicle speed that has been input through the requested vehicle speed input portion 50. The requested vehicle speed calculation portion 55 has, as its basic configuration, a PID computation function of performing computation for PID control using the deviation between the requested number of revolutions and the actual number of revolutions. If the deviation between the requested number of revolutions and the actual number of revolutions is within a preset tolerable range, the requested vehicle speed calculation portion 55 does not perform computation using the PID computation function, and outputs the requested vehicle speed as-is as a computed requested vehicle speed. If the deviation is out of the tolerable range, computation using the PID computation function is performed, and the computed value (computation result) is output as a computed requested vehicle speed. Note that this embodiment employs the following expression as the PID computation function:

$$B*(1+\text{proportional term}+\text{integral term}+\text{derivative term}).$$

Here, B indicates the requested vehicle speed.

In this embodiment, the number of rotations of the left rear wheel 3a is adjusted by the left steering lever 13a, and the number of rotations of the right rear wheel 3b is adjusted by the right steering lever 13b. For this reason, the requested vehicle speed calculation portion 55 includes a left requested vehicle speed calculation portion 551 and a right requested vehicle speed calculation portion 552. The left requested vehicle speed calculation portion 551 calculates, as a requested vehicle speed, a computed requested vehicle speed for the left rear wheel 3a (left computed requested vehicle speed) using a left requested vehicle speed that is based on a user operation made to the left steering lever 13a. The right requested vehicle speed calculation portion 552 calculates, as a requested vehicle speed, a computed requested vehicle speed for the right rear wheel 3b (right computed requested vehicle speed) based on the above-stated expression using a right requested vehicle speed that is based on a user operation made to the right steering lever 13b.

The vehicle speed command generation portion 56 generates a vehicle speed command using the computed requested vehicle speed (left computed requested vehicle speed and right computed requested vehicle speed), and gives the generated command to the vehicle speed control portion 57. The vehicle speed control portion 57 generates a control signal for controlling the traveling unit 3 based on the computed requested vehicle speed (left computed requested vehicle speed and right computed requested vehicle speed). Specifically, a control signal is given to the left HST adjustment motor 311 based on the left computed requested vehicle speed. As a result, the angle of the swash plate of the left HST 31a is adjusted, and the left rear wheel 3a realizes the left computed requested vehicle speed. Similarly, a control signal is given to the right HST adjustment motor 312 based on the right computed requested vehicle speed. As a result, the angle of the swash plate of the right HST 31b is adjusted, and the right rear wheel 3b realizes the right computed requested vehicle speed.

Figure 4:
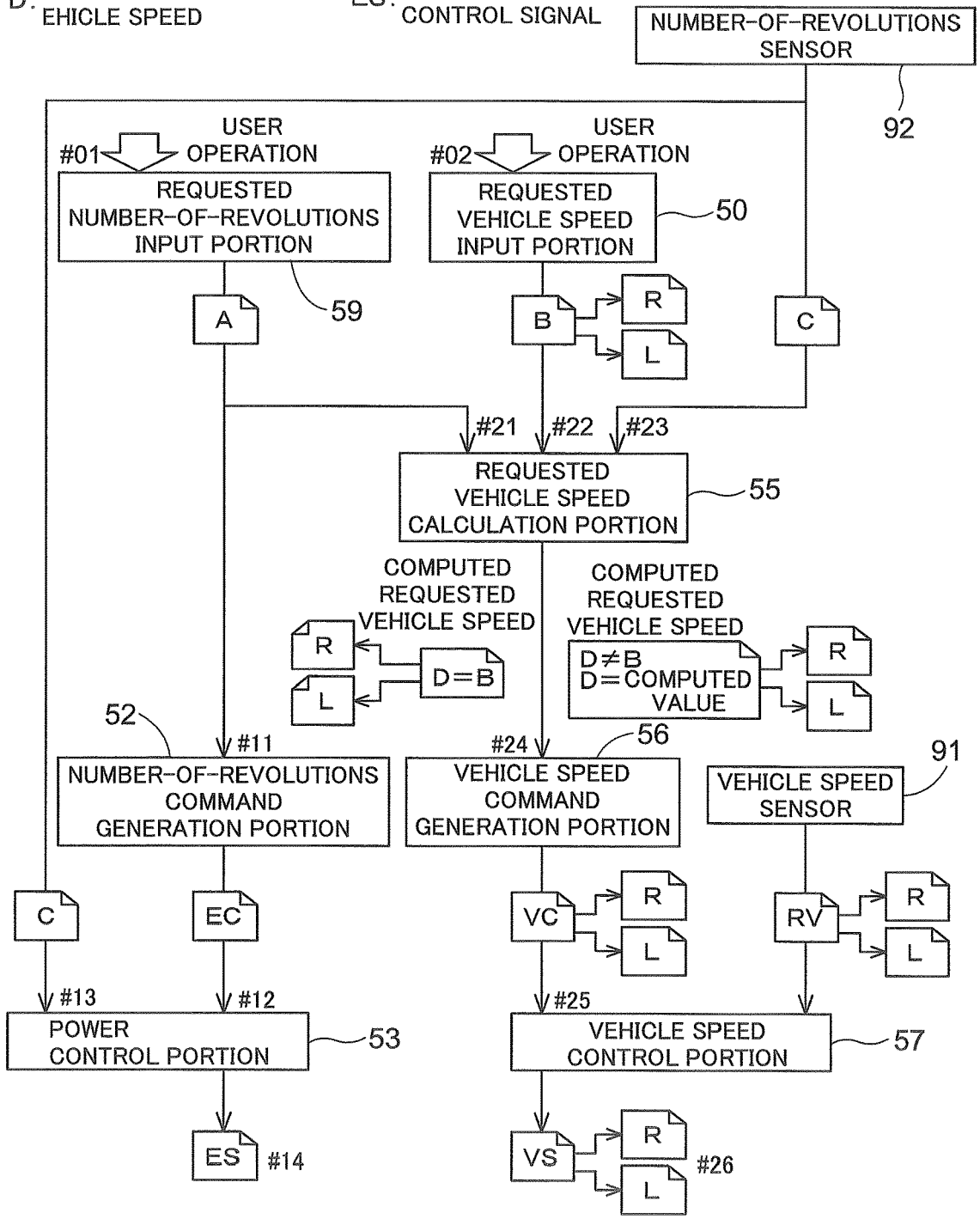
FIG. 4 is a diagram illustrating interlock control for the number of revolutions of the engine and the vehicle speed.

Next, data flow in traveling speed control during a mowing operation will be described using FIG. 4. Note that, in this embodiment, the vehicle speed is defined by rotation of the left rear wheel 3a and the right rear wheel 3b, which are controlled independently of each other. For this reason, in FIG. 4, "L" is appended to control data regarding the left rear wheel 3a, and "R" is appended to control data regarding the right rear wheel 3b.

First, the number of revolutions of the engine set through a user operation is input, as the requested number of revolutions (which are denoted as a sign "A" in FIG. 4), to the requested number-of-revolutions input portion 59 (#01). Amounts of displacement of the left steering lever 13a and the right steering lever 13b made through user operations are input, as requested vehicle speeds for the left rear wheel 3a and the right rear wheel 3b (which are denoted as a sign "B" in FIG. 4), to the requested vehicle speed input portion 50 (#02).

The requested number of revolutions input by the requested number-of-revolutions input portion 59 is given to the number-of-revolutions command generation portion 52 (#11). A number-of-revolutions command is generated, with the requested number of revolutions serving as a target number of revolutions, by the number-of-revolutions command generation portion 52, and this number-of-revolutions command (which is denoted as a sign "EC" in FIG. 4) is given to the power control portion 53 (#12). Furthermore, the actual number of revolutions of the engine 20 (which is denoted as a sign "C" in FIG. 4) detected by the number-of-revolutions sensor 92 is given to the power control portion 53 (#13). The power control portion 53 generates a revolution control signal using the number-of-revolutions command (requested number of revolutions) and the actual number of revolutions, and controls the engine 20 (#14).

The requested vehicle speed calculation portion 55 is given the requested number of revolutions from the requested number-of-revolutions input portion 59, the requested vehicle speed from the requested vehicle speed input portion 50, and the actual number of revolutions of the engine from the number-of-revolutions sensor 92 (#21, #22, #23). The requested vehicle speed calculation portion 55 calculates a computed requested vehicle speed (which is denoted as a sign "D" in FIG. 4) based on the input requested number of revolutions, actual number of revolutions of the engine, and requested vehicle speed, and gives the computed requested vehicle speed to the vehicle speed command generation portion 56 (#24).

Figure 5:
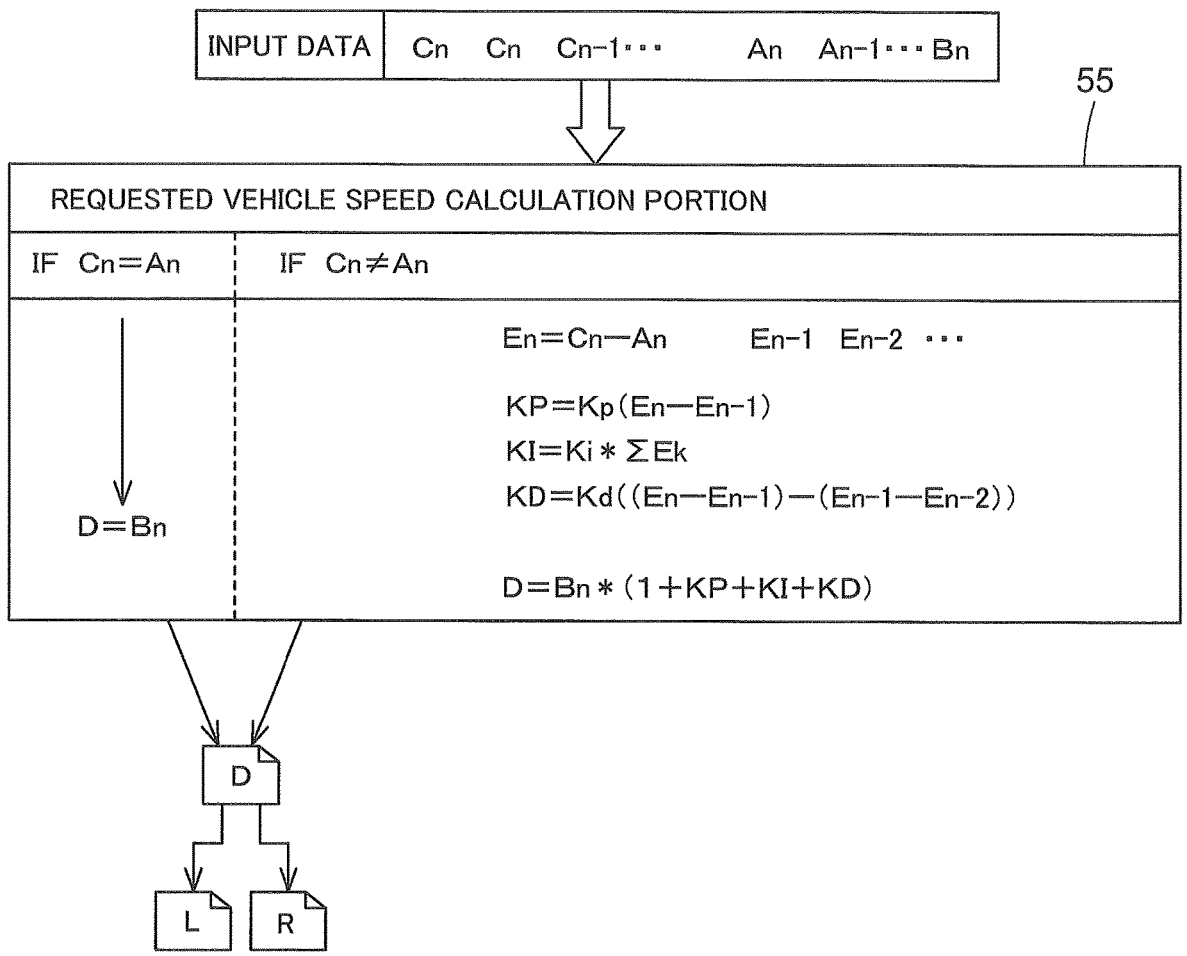
FIG. 5 is a diagram illustrating functions of a requested vehicle speed calculation portion.

An example of a computed requested vehicle speed calculation algorithm in the requested vehicle speed calculation portion 55 is shown in FIG. 5. FIG. 5 shows discrete PID computation. The requested number of revolutions is denoted as $C_n, C_{n-1}, \ldots$. The actual number of revolutions is denoted as $A_n, A_{n-1}, \ldots$. The requested vehicle speed at this time (indicated by a suffix "n") is denoted as Bn. First, if $C_n$ and $A_n$ are substantially equal (i.e. if the difference between $C_n$ and $A_n$ is within a predetermined tolerable range), the requested vehicle speed: $B_n$ serves as the computed requested vehicle speed: D as-is.

If the difference between $C_n$ and $A_n$ exceeds the predetermined tolerable range, the deviation: $E_n, E_{n-1}, \ldots$ between the requested number of revolutions and the actual number of revolutions is obtained, and the proportional term, integral term, and derivative term in the PID control based on this deviation are obtained.

The proportional term: KP is $$KP=Kp(E_n-E_{n-1}).$$

The integral term KI is $$KI=Ki^*\Sigma Ek.$$

The derivative term: KD is $$KD=Kd((E_n-E_{n-1})-(E_{n-1}-E_{n-2})).$$

Furthermore, the computed requested vehicle speed: D is $$D=B_n^*(1+Kp+Ki+KD).$$

The vehicle speed command generation portion 56, which has been given the thus-calculated computed requested vehicle speed, generates a vehicle speed command using this computed requested vehicle speed, and gives the generated vehicle speed command to the vehicle speed control portion 57 (#25). The vehicle speed control portion 57 generates a vehicle speed control signal (which is denoted as a sign "VS" in FIG. 4) based on the computed requested vehicle speed and the actual vehicle speed (which is denoted as a sign "RV" in FIG. 4) from the vehicle speed sensor 91. In this embodiment, the vehicle speed control signal includes a left rear-wheel vehicle speed control signal and a right rear-wheel vehicle speed control signal, and the left HST adjustment motor 311 and the right HST adjustment motor 312 are controlled by the respective signals (#26).

In the above embodiment, the steering unit 13 is constituted by the left steering lever 13a and the right steering lever 13b, which are of a pivot lever type. Alternatively, the steering unit 13 may be constituted by a steering wheel and an accelerator pedal.

In the above embodiment, the engine 20, which is an internal combustion engine, is employed as a single rotary power source. However, an electric motor may alternatively be employed.

In the above embodiment, a mowing machine is described as the traveling work vehicle according to the present invention. Alternatively, the present invention is also applicable to traveling work vehicles such as a snowplow truck, a liquid spray truck, and a fertilizer spreading truck.

In the above embodiment, PID control is employed as vehicle speed control if the deviation between the requested number of revolutions and the actual number of revolutions is out of the tolerable range. However, PI control or PD control may alternatively be employed.

Note that the configuration disclosed in the above embodiment (which includes other embodiments; the same applies below) may be combined with a configuration disclosed in the other embodiments for application, provided there is no inconsistency. The embodiment disclosed in this specification is an example, and the present invention is not limited thereto. The embodiment may be changed as appropriate without departing from an object of the present invention.

The invention claimed is:

1. A traveling work vehicle comprising:
a single rotary power source;
a work apparatus that receives power from the rotary power source;
a traveling unit that receives power from the rotary power source;
a vehicle speed control portion configured to control a vehicle speed of the traveling unit;
a number-of-revolutions calculation portion configured to calculate, as an actual number of revolutions, a number of revolutions of the rotary power source per unit time;
a power control portion configured to control the number of revolutions of the rotary power source;
a number-of-revolutions command generation portion configured to generate a number-of-revolutions command to be given to the power control portion, using a requested number of revolutions for the rotary power source;
a requested vehicle speed input portion configured to input a requested vehicle speed that is based on a user operation;
a requested vehicle speed calculation portion configured to calculate a computed requested vehicle speed using a deviation between the requested number of revolutions and the actual number of revolutions, and the requested vehicle speed; and
a vehicle speed command generation portion configured to give the vehicle speed control portion a vehicle speed command that is generated using the computed requested vehicle speed,
wherein the traveling work vehicle is configured to interlock an adjusted number of revolutions of the engine to an adjusted vehicle speed.

2. A traveling work vehicle comprising:
a single rotary power source;
a work apparatus that receives power from the rotary power source;
a traveling unit that receives power from the rotary power source;
a vehicle speed control portion configured to control a vehicle speed of the traveling unit;
a number-of-revolutions calculation portion configured to calculate, as an actual number of revolutions, a number of revolutions of the rotary power source per unit time;
a power control portion configured to control the number of revolutions of the rotary power source;
a number-of-revolutions command generation portion configured to generate a number-of-revolutions command to be given to the power control portion, using a requested number of revolutions for the rotary power source;
a requested vehicle speed input portion configured to input a requested vehicle speed that is based on a user operation;
a requested vehicle speed calculation portion configured to calculate a computed requested vehicle speed using a deviation between the requested number of revolutions and the actual number of revolutions, and the requested vehicle speed; and a vehicle speed command generation portion configured to give the vehicle speed control portion a vehicle speed command that is generated using the computed requested vehicle speed, wherein the requested vehicle speed calculation portion has a PID computation function of performing computation for PID control using the deviation, if the deviation is within a tolerable range, the requested vehicle speed calculation portion sets the requested vehicle speed as the computed requested vehicle speed, and if the deviation is out of the tolerable range, the requested vehicle speed calculation portion sets a computed value obtained by the PID computation function as the computed requested vehicle speed.

3. The traveling work vehicle according to claim 2, wherein the computed value obtained by the PID computation function is obtained using the following expression:

$$B*(1+\text{proportional term}+\text{integral term}+\text{derivative term}),$$

where, B indicates the requested vehicle speed.

4. The traveling work vehicle according to claim 1, wherein the traveling unit is constituted by a right drive wheel and a left drive wheel that are driven independently of each other, and the requested vehicle speed includes a right requested vehicle speed and a left requested vehicle speed, the computed requested vehicle speed includes a right computed requested vehicle speed and a left computed requested vehicle speed, and the vehicle speed command includes a right vehicle speed command and a left vehicle speed command.

5. The traveling work vehicle according to claim 4, wherein the requested vehicle speed calculation portion has a PID computation function of performing computation for PID control using the deviation, if the deviation is within a tolerable range, the requested vehicle speed calculation portion sets the requested vehicle speed as the computed requested vehicle speed, and if the deviation is out of the tolerable range, the requested vehicle speed calculation portion sets a computed value obtained by the PID computation function as the computed requested vehicle speed.

6. The traveling work vehicle according to claim 5, wherein the computed value obtained by the PID computation function is obtained using the following expression:

$$B*(1+\text{proportional term}+\text{integral term}+\text{derivative term}),$$

where, B indicates the requested vehicle speed.

7. The traveling work vehicle according to claim 1, wherein the rotary power source is an engine, and a continuously variable transmission unit is provided in the traveling transmission mechanism that is located between the engine and the traveling unit.

8. The traveling work vehicle according to claim 7, wherein the requested vehicle speed calculation portion has a PID computation function of performing computation for PID control using the deviation, if the deviation is within a tolerable range, the requested vehicle speed calculation portion sets the requested vehicle speed as the computed requested vehicle speed, and if the deviation is out of the tolerable range, the requested vehicle speed calculation portion sets a computed value obtained by the PID computation function as the computed requested vehicle speed.

9. The traveling work vehicle according to claim 8, wherein the computed value obtained by the PID computation function is obtained using the following expression:

$$B*(1+\text{proportional term}+\text{integral term}+\text{derivative term}),$$

where, B indicates the requested vehicle speed.

10. A traveling work vehicle comprising:
a single rotary power source;
a work apparatus that receives power from the rotary power source;
a traveling unit that receives power from the rotary power source;
a vehicle speed control portion configured to control a vehicle speed of the traveling unit;
a number-of-revolutions calculation portion configured to calculate, as an actual number of revolutions, a number of revolutions of the rotary power source per unit time;
a power control portion configured to control the number of revolutions of the rotary power source;
a number-of-revolutions command generation portion configured to generate a number-of-revolutions command to be given to the power control portion, using a requested number of revolutions for the rotary power source;
a requested vehicle speed input portion configured to input a requested vehicle speed that is based on a user operation;
a requested vehicle speed calculation portion configured to calculate a computed requested vehicle speed using a deviation between the requested number of revolutions and the actual number of revolutions, and the requested vehicle speed; and
a vehicle speed command generation portion configured to give the vehicle speed control portion a vehicle speed command that is generated using the computed requested vehicle speed,
wherein the calculated computer requested vehicle speed utilizes a proportional term, an integral term and a derivative term that are each based on the deviation.

* * * * *